INVENTOR.
Jaromir K. Sazavsky

Dec. 16, 1958     J. K. SAZAVSKY     2,864,339
WIDE DEAD ZONE CONTROL WITH SET POINT RETURN
Filed Feb. 27, 1957     3 Sheets-Sheet 2
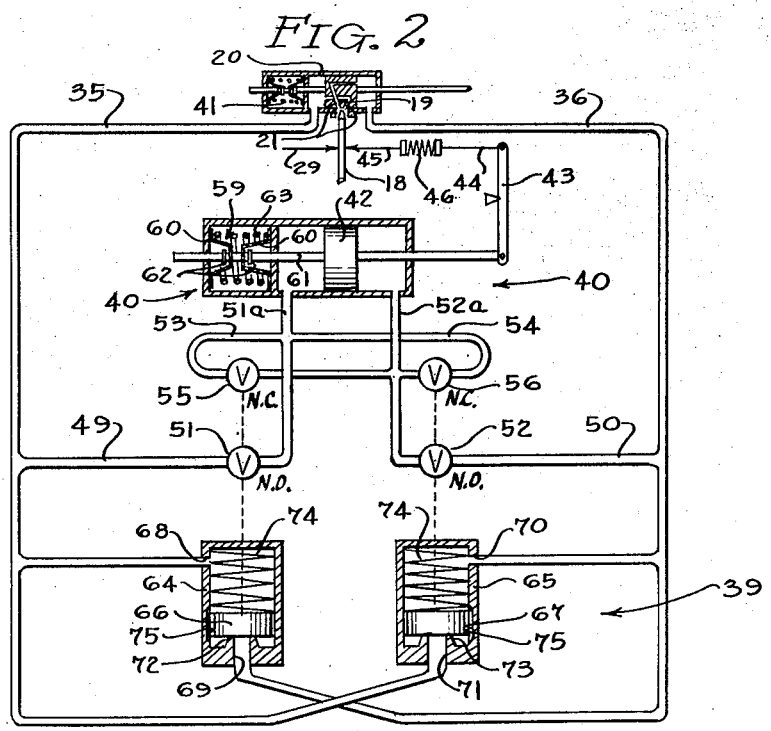
INVENTOR.
Jaromir K. Sazavsky
BY
Attorneys Dec. 16, 1958    J. K. SAZAVSKY    2,864,339
WIDE DEAD ZONE CONTROL WITH SET POINT RETURN
Filed Feb. 27, 1957    3 Sheets-Sheet 3

INVENTOR.
Jaromir K. Sazavsky
BY
Attorneys

United States Patent Office 2,864,339
Patented Dec. 16, 1958

2,864,339

WIDE DEAD ZONE CONTROL WITH SET POINT RETURN

Jaromir K. Sazavsky, Chicago, Ill., assignor to GPE Controls, Inc., Chicago, Ill., a corporation of Illinois Application February 27, 1957, Serial No. 642,801

25 Claims. (Cl. 121—41)

The present invention relates to automatic, error signal responsive relay regulation and particularly to provision for a specialized type of relay response to the error signal.

In certain situations, one of which is hereinafter described, it is desirable to so arrange the relay system that during increase of error in the controlled condition from zero to a certain preselected magnitude, the system will not respond, but, upon increase of error to magnitude greater than the preselected magnitude the system will respond to correct the condition to zero error magnitude. It is well known, of course, that automatic relay systems may be arranged with substantial dead zones, so that the system will not respond to errors of less magnitude than preselected for initiation of system response. Such systems, however, tend either to terminate correction at the one of the dead zone limits that has been passed during a given increase of error, or to overcorrect to the opposite dead zone limit and possibly set up a periodic transfer of the controlled condition between magnitudes corresponding to the two limits of the dead zone. A feature of the present system arrangement is that once the preselected magnitude of condition error has been reached, the system acts to restore the condition to its selected value at which time operation ceases. In other words, once the error has reached the selected limit the dead zone is eliminated until the controlled condition has been returned to the required magnitude, at which time corrective action is terminated and the dead zone automatically is reestablished.

A primary object of the invention is provision of a novel type of system arrangement for providing the described mode of operation.

Another object is provision of such an arrangement type that presents great flexibility of choice in components that may be combined in an automatic relay regulating system having the described mode of operation.

The objects of the invention are accomplished by providing, in a relay system of successively moving members including a movable signal input control member that is positionable relative to a neutral position in correspondence to magnitude of an error signal, an amplifier that is responsive to movement of the control member for delivering operating energy, and a transmission member movable by the amplifier, of translating means interposed between two of the system members and that is convertible between a lost motion condition permitting the succeeding member to remain stationary and non-responsive to movement of a preceding train member, and an operating condition wherein the succeeding member is maintained in positional correspondence to the preceding member; together with selector means responsive to increase of magnitude of error signal to the value preselected for initiating system response to convert the translating device to the second condition, and further that serves to reconvert the translator to its lost motion condition only upon decrease of the error signal magnitude to the value corresponding to zero error.

In the accompanying drawings:

Figure 2 is a schematic diagram of a complex control valve unit used in the Fig. 1 system.

Fig. 3 is a schematic diagram of a hydraulic relay system embodying a mechanical form of the invention.

Figure 1:
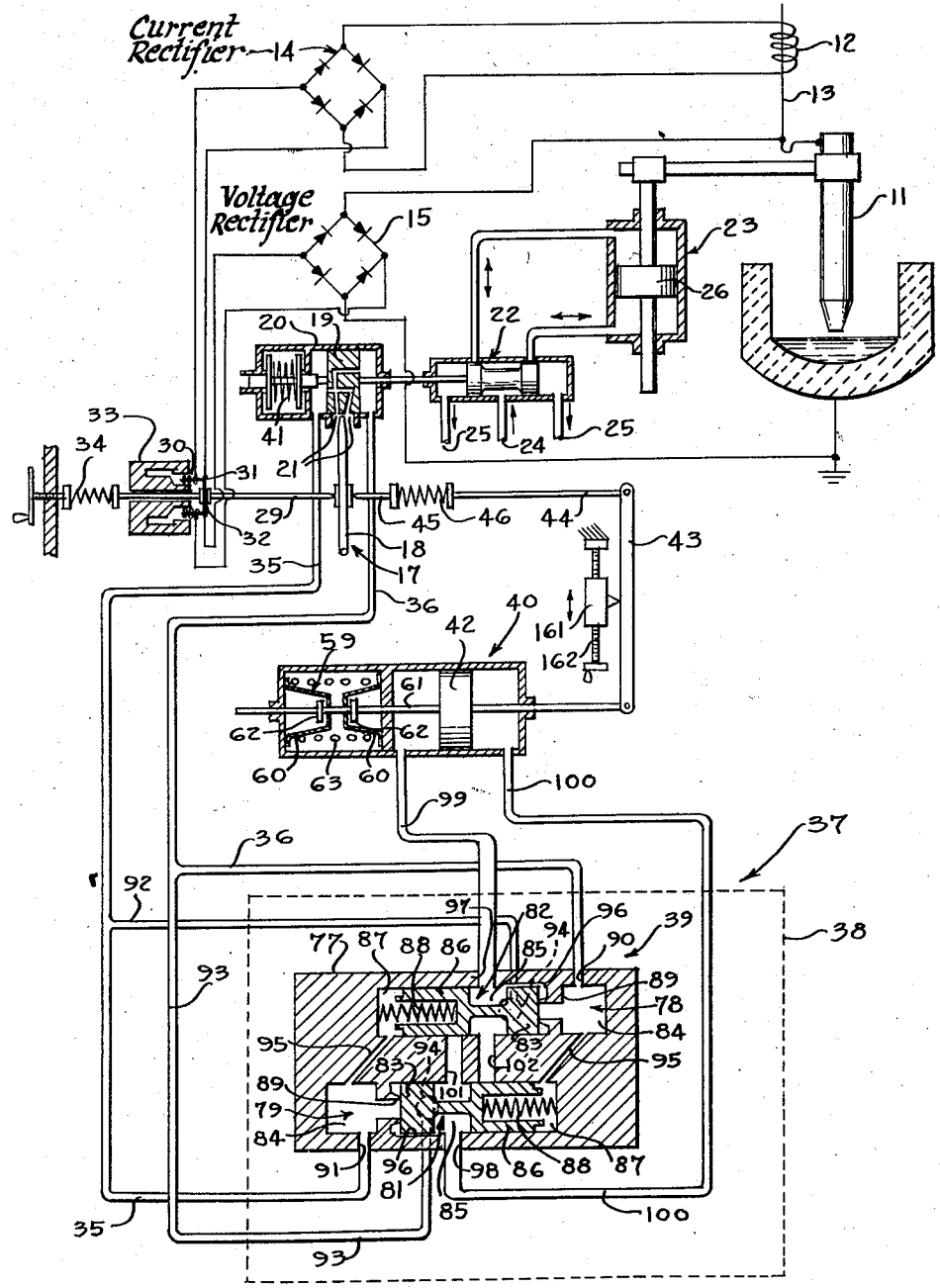
Fig. 1 is a schematic diagram of a hydraulic relay system, embodying the invention in hydraulic form, and showing application of the system to control of position of an arc furnace electrode.

Describing the drawings in detail, and first referring to Fig. 1, an arc furnace electrode is shown at 11, and is to be axially positioned in response to variation in arc impedance as measured by a current intensity detecting system comprising a transformer secondary 12 inductively coupled to a carbon current lead 13 and a rectifier 14, and a voltage amplitude detector comprising a rectifier 15 with its input connected across the arc.

In certain arc furnace operations wheerin a crust forms on top of the bath and becomes attached to the carbons, it is desirable to move the carbons, to adjust arc current intensity to an ideal magnitude, at as infrequent intervals as is consistent with maintenance of current magnitude that will perform the process in a satisfactory manner, in order to minimize disturbance of the crust and danger of mechanical damage to the carbons. However, when current intensity has sufficiently departed from the ideal value to make correction imperative, then it is desirable to adjust the carbon position until the ideal current intensity has been reestablished, rather than to some intensity between the ideal and the value that makes correction imperative. The system type presented by the invention herein disclosed is ideally suited to this field of service.

In Figs. 1 and 2 numeral 17 indicates generally a hydraulic relay regulator of the well known jet, auxiliary piston and booster type. A jet pipe 18 is pivoted to swing about an axis to which it is radial and from its tip discharges a high velocity jet of fluid toward a piston 19 that is movable in a cylinder 20 in the directions of jet pipe tip movement. Cross connected ports 21 in piston 19 deliver pressures developed in them by the jet to opposite ends of the piston. In the conventional arrangement, when pipe 18 is in unequal registration with the ports the resulting pressure unbalance moves the piston in the direction to reestablish equal registration of the ports with the jet pipe at which point pressure differential disappears, and so the piston follows the jet pipe. The booster comprises a spool type control valve, 22 in Fig. 1, connected to piston 19 and controlling connection of the respective ends of the power unit cylinder 23, with pressurized fluid supply and exhaust lines 24, 25. The piston 26 of the power unit positions electrode 11.

The movable control signal input element of regulator 17 comprises a transmission rod 29 by which a force or position signal is imposed on jet pipe 18. In the system of Fig. 1, electrical currents respectively corresponding to arc current and arc voltage of the arc supplied by carbon 11, and respectively delivered by rectifiers 14, 15 are translated to a force which rod 29 transmits to the jet pipe. Translation is accomplished by dual windings 30, 31 respectively fed by rectifiers 14 and 15, which windings are carried by a spider 32 and positioned in an annular gap of a permanent magnet 33. A bias spring 34, the compressive condition of which is adjustable for selection of the set point, corresponding to a required arc impedance, biases rod 29, and jet pipe 18 in such fashion that, so long as electrical power consumed by the arc developed by carbon 11 is at a selected magnitude, for which spring 34 is set, the jet pipe remains in a neutral position wherein control valve 22 is in cutoff condition.

In accordance with the invention, a translator device is arranged between the current-to-force translator device 30, 31, 32, 33 and the control valve 22, as follows:

Connected to the opposite ends of auxiliary piston cylinder 20 are a pair of fluid lines 35, 36 for delivery of fluid to a system condition selector assembly, designated generally 37 as enclosed by dotted line 38 and including a complex control valve assembly 39, shown somewhat simplified and schematically in Fig. 2, and a signal magnitude responsive piston and cylinder assembly 40. For purposes of the invention, and as part of the translator device interposed between jet pipe 18 and auxiliary piston 19, the latter is biased to its neutral position, wherein control valve 22 is in cutoff condition, by a centering spring system 41. Piston 42 of the storage assembly 40 is similarly biased to a neutral intermediate position. By transmission mechanism including a lever 43 connected to piston 42, transmission rods 44, 45 and a spring 46, movement of piston 42, which movement is in consequence of deflection of jet pipe 18 from its neutral position, as will be made clear, is translated to a restoring force that returns jet pipe 18 toward its neutral position following its deflection from that position in response to variation in current energizing windings 30, 31.

Referring to Fig. 2, it will be seen that the lines 35, 36 respectively are connected, by branch lines 49, 50 which respectively have normally open cutoff valves 51, 52, with the different ends of the cylinder of accumulator assembly 40. These cylinder ends also are interconnected by a bypass system that includes sections of branch lines 49, 50 and parallel bypass lines 53, 54 which respectively are provided with normally closed cutoff valves 55, 56. The arrangement is such that in the normal condition, which prevails while the error is of less magnitude than that selected to initiate system operation, and with valves 51, 52 open and valves 55, 56 closed, fluid supplied to one of lines 35, 36 as a consequence of deflection of jet pipe 18 from its neutral position and in the direction of one of the receiver ports 21, will be delivered to the corresponding cylinder end of assembly 40, while fluid is permitted to escape from the other of the lines 35, 36 through cylinder 20 and to the other port 21. In this condition spring system 41 maintains piston 19 in its neutral position. Resulting unbalance of pressure across piston 42 causes the latter to move and, through transmission mechanism 43, 44, 46, 45 exerts on jet pipe 18 a restoring force that opposes the deflecting force exerted through rod 29.

The combination of auxiliary piston centering spring system 41, assembly 40 and the resetting mechanism 43, 44, 45, 46 serves to maintain auxiliary piston 19 and control valve 22 in neutral conditions, by restoring the jet pipe to its neutral position after each deflection. Consequent movement of piston 42 toward its neutral position by its bias spring, and as permitted by fluid return through a line 35 or 36, cylinder 20, and one of ports 21, sets up an equilibrium condition wherein the jet pipe and piston 42 are maintained displaced from their neutral positions to degrees determined by magnitudes of error signal and force exerted on piston 42 by a bias system 59, the resistance of the latter being so related to resistance to movement of piston 19 by spring system 41 that piston 19 is maintained in its neutral position. Resistance of bias system 59 is so selected that piston 42 reaches a limit position in response to increase of error signal magnitude variance from the value preselected to represent zero error to the value preselected to initiate system response.

Bias system 59, which urges piston 42 to a selected intermediate neutral position in the cylinder, includes a pair of spring mounts 60 slidably penetrated by a rod 61 of piston 49 which is provided with contact members 62. A spring 63 is interposed between supports 60. During movement of piston 42 in a given direction the corresponding support 60 moves with rod 61 toward the other support 60, compressing spring 63. When the moving one of supports 60 contacts the second support 60 piston 42 is stopped. The bleeder lines 35, 36 and assemblies 39 constitute the convertible translators. Figs. 1 and 2 respectively show different specific forms of hydraulic control valve devices that can be used as the assemblies 39.

Briefly describing the general mode of operation of the system of Figs. 1 and 2 before detailed description of the control valve assemblies 39, it will be seen that so long as an error signal, variance of magnitude of deflecting force exerted on jet pipe 18 through rod 19 from a preselected value representing zero error, is within a range, determined by system characteristics such as that of the feedback train 43, 44, 45, 46 and by relative resistances of spring systems 63 and 41 the latter of which is selected to be greater than the former, and additionally is selected to corespond to the range of increasing error wherein the system is not to act, the latter ultimately being determined by the range of movement of piston 42 between its limit poistions, auxiliary piston 19 will be maintained stationary and in its neutral position. This neutral position corresponds to the neutral or cutoff position of the body of valve 22, Fig. 1, and the latter constitutes the poistion controlled member of the entire system. During this condition the maximum differential between internal pressures in bleeder lines 35, 36 is determined by the resistance of spring system 63 to movement of piston 42, incidentally such maximum being insufficient to move piston 19 due to selection of the relative resistances of spring systems 41, 59, mentioned above. In response to increase of error signal magnitude to the degree corresponding to the preselected dead zone limit, a preselected degree of variance from its zero-representing value, piston 42 will reach one of its limit positions. This will, of course, terminate the described limitation of the maximum pressure differental between lines 35, 36 therefore imposed by spring system 59, and the differential then increases sharply. The increased differential is sensed by control valve assembly 39, which, in order to eliminate imposition on jet pipe 18 of the resetting force transmitted through feed-back train 43, 44, 46, 45, opens one or the other of the normally closed bypass valves 55, 56, interconnecting the ends of the cylinder of assembly 40 to permit piston 42 to be returned to its normal position by spring system 59. Removal of this force permits jet pipe 18 to swing to a position corresponding to the magnitude of the error signal. Valve assembly 39 also closes the valve 51 or 52 of the bleeder line that is at the higher pressure, which will be the one that is connected to the bypass valve 55 or 56 that has been so opened. Auxiliary piston 19 then moves to the position wherein its ports 21 are equally registered with jet pipe 18 and corresponding to that of the jet pipe correspondingly positioning control valve 22 and delivering power fluid to the power unit, as 23 of Fig. 1. The corrective condition, wherein piston 42 is bypassed and maintained in its neutral position, and wherein auxiliary piston 19 and the body of control valve 22 are positioned in corespondence to the position of jet pipe 18 and magnitude of error signal, constitutes the positive drive condition of the convertible translator interposed between jet pipe 18 and auxiliary piston 19, and continues until the error signal has been reduced to substantially zero, here its zero-representing value. The convertible translator in the Figs. 1 and 2 form comprises the thrust rod 29, the jet pipe 18 and the auxiliary piston 19, with provision by the auxiliary equipment described for establishing alternatively a lost motion condition wherein movements of jet pipe 18 are not accompanied by responsive and corresponding movements of auxiliary piston 19 and the ultimate position-controlled member, the spool of valve assembly 22, and a positive drive condition wherein the latter two elements follow movements of the jet pipe.

Control valve assembly 39 accomplishes translations between normal or dead zone or lost motion condition, and the positive drive, abnormal or corrective condition of the system, the latter condition being established in response to arrival of piston 42 at a maximum displacement limit position, and the former condition being established in response to restoration of balance of pressures of fluid in lines 35, 36, a condition that occurs upon return of both the jet pipe 18 and the spring-biased auxiliary piston to their neutral positions as a result of decrease of error signal magnitude to substantially its zero-representing value.

Control valve assembly 39 as it is shown in Fig. 2 includes a pair of actuator cylinders 64, 65, respectively having actuator pistons 66, 67 which respectively are connected to the operators of valves 51 and 55 and the operators of valves 52, 56. Cylinder 64 has a pair of ports 68, 69 respectively connected with fluid lines 35 and 36, and cylinder 65 has a pair of ports 70, 71 connected respectively with fluid lines 36 and 35. The port arrangements and connections are such that cylinders 64, 65 are connected to lines 35, 36 in reversed senses with respect to sense of unbalance of pressures in lines 35, 36 necessary to open valves 55, 56. Ports 69, 70 open into the ends of the cylinders wherein pressure is effective to close valves 55, 56 and open valves 51, 52. These cylinder ends are provided with structures, shown as nipples 72, 73 having end surfaces disposed for direct contact by the facing end surfaces of the pistons 66, 67 when the pistons are at the limits of their strokes toward the nipples, which are the normal or dead zone positions of these pistons, and the inner openings of the nipples define piston face areas smaller than the internal cross area of the cylinder bores. The inner openings of nipples 72, 73 respectively communicate with ports 69, 71. The purpose of nipples 72, 73 is to restrict the piston surface areas upon which are effective the fluid pressures present in their lines 35, 36 while the pistons contact the end surfaces of the nipples, the positions of pistons 66, 67 being their neutral or normal ones, and this being the normal condition prevailing while the dead zone condition of the system is in effect. Each cylinder 64, 65 is provided with a spring 74, which springs respectively bias pistons 66, 67 to their neutral positions. It will be seen that so long as pressures in lines 35, 36 are equal, or unbalanced in a sense to displace one piston in opposition to its bias spring, but to a degree resulting in piston force less than the biasing spring force, the pistons will be held in or moved to their normal positions. It will also be evident that, due to restriction of piston surfaces upon which are effective, the pressures admitted by ports 69, 71, such pressures being opposed to forces of bias springs 74 as well as of pressures admitted by ports 68, 70, must to a material degree exceed the pressures admitted by ports 68, 70 to accomplish movement of the pistons from their neutral positions. Bleeder passages 75 are provided to eliminate pressure buildup in the spaces surrounding nipples 72, 73 by leakage past the contacting piston and nipple end surfaces while the pistons are in their normal positions. Upon movement of a piston 66 or 67 from seating upon the corresponding nipple, the pressure admitted by port 69 or 71 immediately becomes effective upon the entire piston face, and the piston immediately is moved to the other limit of its stroke, reversing the condition of the connected pair of valves 51, 55 or 52, 56, opening valve 55 or 56 to establish the bypass about piston 42 of assembly 40 and closing valve 51 or 52 to cut off the higher pressure line 35 or 36 from assembly 40.

Actuation of one of pistons 66, 67 from its normal position corrective condition of the system is in response to arrival of piston 42 at one of its limit positions, as determined by spacing of spring supports 60 and stops 62 of assembly 40.

Due to the force exerted by the auxiliary piston centering spring systems while piston 19 is displaced from its neutral position during the corective operative condition of the system, piston 19 does not have to a position wherein the two receiver ports are in perfectly equal registration with the jet pipe discharge orifice and wherein pressures at opposite ends of piston 19 would be exactly balanced. This condition results in an unbalance across the actuated one of pistons 66 or 67 which is sufficient to resist the force of the bias spring 74 acting on that piston and maintain that piston in its actuated position, in unseated relation to the nipple of that assembly. As error signal magnitude diminishes to zero, jet pipe 18 and auxiliary piston 19 return to their neutral positions, the force exerted by spring system 41 diminishes and at the neutral positions of jet pipe and auxiliary piston the pressure differential across piston 19 disappears due to elimination of opposed hydraulic and biasing forces. Consequently pressures in pipes 35, 36 become equal and the pressure differential that has maintained one of pistons 66, 67 unseated and in its actuated position disappears, permitting that piston to be returned by its bias spring. Thereby the dead zone condition is re-established, but only in response to disappearance of error signal and restoration of jet pipe 18 to its neutral position.

Control valve assembly 39 is shown in Fig. 1 in its preferred form of a complex unit. The unit comprises a body 77 containing a pair of cylinder bores 78, 79 that respectively correspond to cylinders 64, 65 of Fig. 2. In these cylinders are compound piston and valve bodies 81, 82 each including a first land portion 83 separating cylinder chambers 84 and 85 and a second land portion 86 separating chamber 85 from a third chamber 87. Positionally these bodies are relatively reversed with respect to directions of their movement to close valves that correspond to the normally open valves 51, 52 of Fig. 2. Bias springs 88 urge bodies 81, 82 in the directions of chambers 84, and to seating relation with piston surface area defining nipples 89 that are disposed in chambers 84 and that correspond to nipples 72, 73 of Fig. 2. Fluid delivery lines 35, 36 are connected to ports 90, 91 that respectively open into chambers 84 of the different bores 78, 79 to the opposite sides of nipples 89 from lands 83. Branch lines 92, 93 of lines 35, 36 respectively are connected to ports 94 that respectively open into bores 78, 79 in such locations that they are at least partly cleared by lands 83 and open into chambers 85 so long as the bodies 81, 82 are in their normal positions wherein they are seated against structures 89. Ports 94 also are located to be completely obstructed by lands 83 while the bodies are at the opposite ends of their strokes in their actuated positions. Lines 35, 36 are also connected to chambers 87 of the respective bores 79 and 78 by passages 95 in the structure separating the bores and connecting the chamber 84 of each bore to the chamber 87 of the other bore. Bleeder ways 96 corresponding to bleeders 75 of Fig. 2 are cut in the bore walls to bypass lands 83 while seated against structures 89. Controlled ports 97, 98 are connected to the opposite cylinder ends of assembly 40 by lines 99, 100. A pair of ports 101, 102 interconnect cylinder bores 78, 79 in such locations that each is blocked by a land 86 while bodies 81, 82 are in their normal positions and one or the other is opened to establish communication between chambers 85 when a body 81 or 82 is moved to its actuated position.

The complete system of Fig. 1 operates as follows. When either or both arc current and arc voltage depart from a preselected magnitude, representing a variance from an arc power value for which spring 34 is set, a corresponding change occurs in the magnitude of the current output of the corresponding one or both of the rectifiers 14, 15. This will result in a deflection of jet pipe 18 from its neutral or zero position since it would be reflected by a change in force exerted by the electromagnet assembly 31, 32, 33. In the absence of the auxiliary control arrangement of the invention, this deflection would result in movement of the auxiliary piston 19 and a corresponding movement of the auxiliary piston 19 and a corresponding movement of the spool of control valve 22. The latter would result in connecting the ends of the cylinder of power unit 23 with exhaust and supply lines 25, 24 and electrode 11 would be moved. It will be understood that the senses of current, force and movements of jet pipe, piston and control valve would be such as to move electrode 11 in the direction to readjust the impedance of the arc in the proper sense to reestablish the required arc power.

Operation of the control assembly of Fig. 1 corresponds to that of the assembly of Fig. 2. During dead zone operation lines 35, 36 are connected to the cylinder ends of cylinder assembly 40 by communication of ports 97, 98 with ports 94 through chambers 84 of the respective bores. During this dead zone operation fluid delivered to one or the other of ports 21 at a higher volume rate, as a consequence of jet pipe deflection toward that port, will be accumulated in one end of the cylinder of assembly 40, the piston 42 being moved by that fluid, while auxiliary piston 19 will be maintained substantially in its zero position by its bias spring system 41. Movement of piston 42 also tends to maintain jet pipe 18 in its neutral position through the resulting system 43, 44, 45, 46. Therefore, during dead zone operation, control valve 22 remains in its neutral condition and power unit 23 retains electrode 11 stationary in spite of errors of less than the magnitude preselected to initiate corrective action. In this condition restriction of the piston end surface areas of lands 83 by the structures 89 of the chambers 84 limits the force exerted on the piston surface of the land 83 by the higher of the pressures of line 35, 36, and the limit of which pressure is determined by the resistance of the selector piston bias spring system 63. This force limitation is such that the bias spring 88 that is subjected to the higher of the pressures of lines 35, 36 is not overcome until piston 42 reaches its limit position, at which time the consequent rise of pressure in chamber 84 wherein the pressure is higher unseats body 81 or 82, exposing the full end area of the land 83 that faces that chamber 84 to the pressure of that chamber. The opposite sense of pressures in the other cylinder, aided by the bias spring thereof, maintains that piston seated. The large force that immediately becomes effective upon the end surface of this unseated land 83 moves the body 81 or 82 of which that land is a member to the opposite end of its stroke, closing communication between ports 94 and 97 or 98, which corresponds to closing of valve 51 or 52 of Fig. 2, and opening communication between ports 97, 98 through chambers 85 and one of ports 101, 102, corresponding to opening of one of valves 55, 56 of Fig. 2, establishing a bypass around piston 42.

When the bypass about piston 42 is established and the latter is returned to its zero position, the resetting force exerted on jet pipe 18 is removed, permitting it to be deflected to a position corresponding to the error signal imposed on it through rod 29. The cutting off from cylinder assembly 40 of the higher pressure line 35 or 36, effected as described immediately above by closing communication between one of ports 94 and the corresponding controlled port 97 or 98, terminates relief of the pressure in the end of the cylinder 20 to which fluid is delivered at the higher rate as a consequence of the jet pipe deflection. Consequently piston 19 will move to a position wherein ports 21 are in equal registration with the jet pipe orifice. This will result in correspondingly setting control valve 22 and operation of power unit 23 to move electrode 11. Due to maintenance of the actuated piston-valve body 81 or 82 in its actuated position until jet pipe 18 has returned to its neutral position, equalizing the pressures in lines 35 and 36 and permitting return of the actuated piston-valve body by its bias spring 88, auxiliary piston 19 and valve 22 will be operated in correspondence to movement of jet pipe 18 as error diminishes in consequence of repositioning of electrode 11. When error has completely disappeared and jet pipe 18 has returned to its neutral position, the dead zone condition will be reestablished by return of the actuated body 81 or 82 to its normal position.

Fig. 3 shows a system arranged to accomplish the same type of operation by a convertible translator in the form of purely mechanical means, the primary relay system again being shown as hydraulically powered and provided with a jet pipe regulator.

In this arrangement the regulator includes a jet pipe 105 that is pivoted for swinging of its tip discharge orifice in the directions of spacing of a pair of fixed receiver ports 106 that respectively are connected to opposite ends of a regulator cylinder 107. Piston 108 accordingly moves in response to deflection of jet pipe 105 from its neutral position of equal registration with ports 106. To proportion movement of piston 108 to degree of jet pipe deflection a jet pipe restoring system is employed, including a lever 109 coupled to piston 108 by a rod 110, and a spring 111 interposed between transmission rods 112. A second piston rod 113 is connected to the translator, which is in the nature of a lost motion and lockout device 114, arranged to absorb the movement of the piston in stroke distances corresponding to the preselected dead zone of the system while the succeeding transmission element is maintained in its neutral position, and, upon arrival of the piston at the end of such a stroke distance, to move the succeeding movable member to a position corresponding to that of the piston, couple the succeeding member to the piston for positive drive thereby, and maintain it so coupled until the piston and jet pipe have returned to their neutral positions, then to release the positive drive, reestablishing the lost motion operation of device 114, and consequently reestablishing the dead zone condition of the system.

Device 114 comprises a casing 115 that is movable in the directions of rod 113 and that is movable relative to rod 113 which enters one of its ends and extends through a chamber that it encloses. The opposite end of casing 115 is connected to a transmission member 116 that actuates the energy delivery control device, here a spool type control valve 117. Inside casing 115 is a pair of spring supports 118 that are slidably penetrated by rod 113 and between which is supported a compression spring 119. A pair of stop lugs 120 for energizing supports 118 are carried by rod 113 so that movement of the latter in either direction will move one support 118 toward the other, compressing spring 119, and permitting rod 113 to move relative to casing 115 until the support 118 so moved contacts the other support, or until the increasing resistance of the progressively compressed spring 119 overcomes the restraining means provided for casing 115.

These means comprise a pair of latch members 121, 122 that are pivotally mounted for swinging about axes that are disposed transverse to direction of motion of rod 113, and each has a contact end 123 for contacting an end surface of casing 115. Springs 124 bias the latches respectively in directions to resist movement of casing 115 while their ends 123 are in contact with the end surfaces of casing 115. The latches are so arranged that upon overcoming of a bias spring 124 by a force exerted to move casing 115 in the direction that it opposes, the latch biased by that spring will be turned aside and slid over by the adjacent lateral wall portion of the casing.

It will now be seen that during dead zone operation, movement of piston 108, which will be proportional to degree of jet pipe deflection and magnitude of error signal exerted to deflect the jet pipe, will be absorbed by spring 119, casing 115 and the connected transmission mechanism 116 and energy delivery control device 117 being restrained by one of latches 121, 122. When piston movement from its netural position has increased to correspond to a dead zone limit, the bias spring 124 of the restraining latch is overcome, spring 119 expands moving casing 115 to a position corresponding to those of piston 108 and jet pipe 105, and positioning the movable control element of device 117 in correspondence to the magnitude of the control signal. Thereafter, during corrective operation of the system casing 115 moves with rod 113 until, as error diminishes, the displaced latch is restored to its casing-restraining condition, which occurs when piston 108 has returned to substantially its neutral position, that wherein it is shown. The end 123 of the latch in question then slips past the corner of casing 115 and its restraining relation to the casing end is reestablished, thereby restoring the lost motion condition of the translator interposed between the preceding train element, rod 113 and the succeeding element, lever 116, and reestablishing the dead zone condition of the system.

Figure 4:
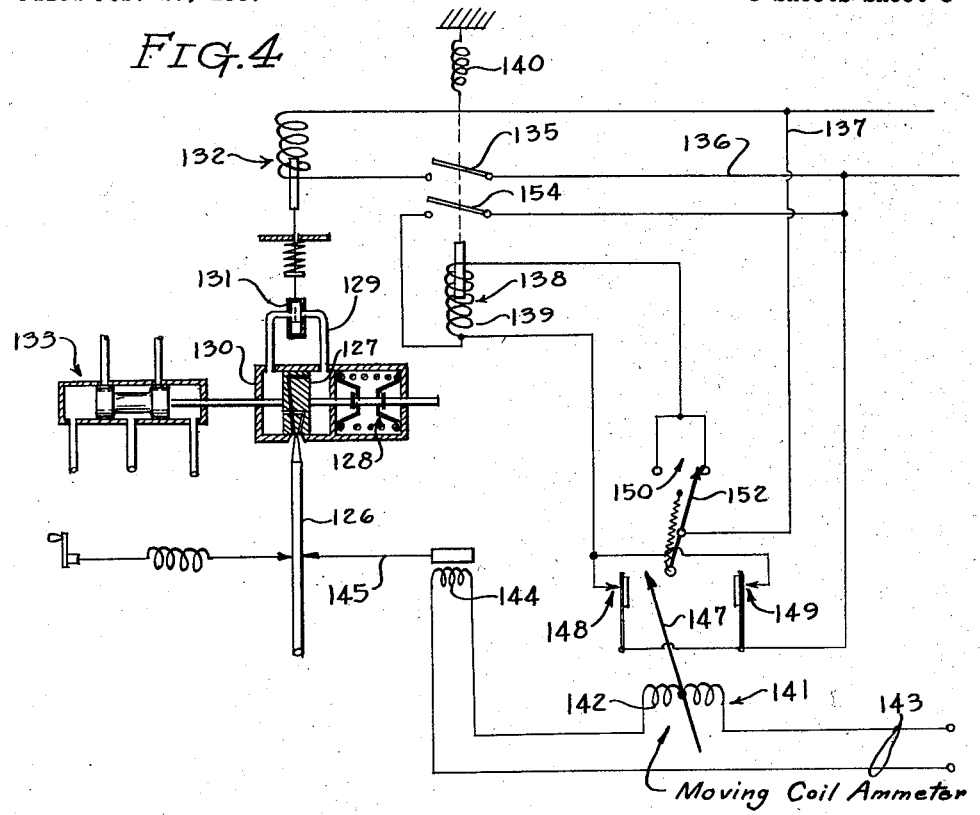
Fig. 4 is a schematic diagram of a hydraulic relay system embodying an electrical form of the invention.

Fig. 4 discloses a hydraulic relay system provided with an electrical system condition selector for converting a hydraulic translator between lost motion and positive drive conditions, arranged according to the invention. In the system of Fig. 4 the regulator 125 includes a jet pipe 126 and an auxiliary piston 127, which in accordance with the invention is provided with a centering bias spring system 128 and a bypass line 129 that connects the ends of its cylinder 130 and that has connected therein a cutoff valve 131 that is operated by a solenoid 132. In the arrangement shown, valve 131 is opened and closed respectively by deenergization and energization of the winding of solenoid 132. While valve 131 is open, deflection of jet pipe 126 from neutral position results in flow of fluid through bypass 129 rather than in movement of the spring centered auxiliary piston 127. While that valve is closed deflection of the jet pipe results in corresponding movement of piston 127, and positioning of the movable member of the energy delivery control device, shown as a spool type control valve 133.

The system for energization and deenergization of the winding of solenoid 132 is arranged in accordance with the invention to present the described mode of operation, a dead zone condition that prevails during increase of error signal magnitude from zero, establishment of a corrective operating condition at the preselected dead zone limit of error signal magnitude, maintenance of that condition until error signal magnitude diminishes to substantially zero, and reestablishment of the dead zone operation when the signal has so diminished.

An energization switch 135, which is open during the dead zone condition, is connected in one lead 136 of a power circuit, the other lead of which is designated 137, and is controlled by a solenoid 138 having a winding 139 and a return spring 140, the arrangement shown being such that winding 139 is energized to close switch 135.

Energization of winding 139 is controlled by an error signal current responsive device, here shown as an ammeter 141 having its moving coil 142 connected in a signal current circuit 143 in series with a jet pipe control input coil 144 that is energizable to produce a force exerted through transmission rod 145 to position jet pipe 126. Ammeter 141 is provided with a needle 147 that selectively and in accordance with error signal current magnitude actuates three switches 148, 149, 150. Switches 148, 149 are connected parallel between a lead 137 of the power circuit and one terminal of solenoid winding 139. These two switches are normally open and are positioned for closing one and the other respectively as error current magnitude indicates increase of the error to the different preset limits of the dead zone.

The third switch 150 is connected between the other terminal of solenoid winding 139 and the second power circuit lead 137. This switch is normally closed and is arranged to be momentarily opened, then reclosed as error current diminishes to substantially zero, and needle 147 correspondingly arrives at its zero position. Switch 150 may comprise a pair of contacts both connected to the terminal of winding 139, and a movable contactor 152 that is spring biased in two position snapover fashion, the contactor being arranged to be moved from closing with one contactor and past its dead center as needle 147 arrives at its zero position.

A holding switch 154 is connected parallel to switches 148, 149 between the first terminal of winding 139 and power circuit lead 136. The contactor of switch 154 is closed upon energization of solenoid winding 139, and thus serves to maintain that winding energized after it has been first energized by closing of one of switches 148, 149, and after that switch has opened. This operation serves to maintain the system in corrective condition after it has been established, during the period of decreasing error within the set dead zone range. Upon reduction of the error signal to substantially zero magnitude switch 150 opens to deenergize solenoid winding 138, which opens the holding switch 154, as well as the supply switch 135 that opens the bypass valve 131. Thereby the system is returned to its dead zone condition.

Figure 5:
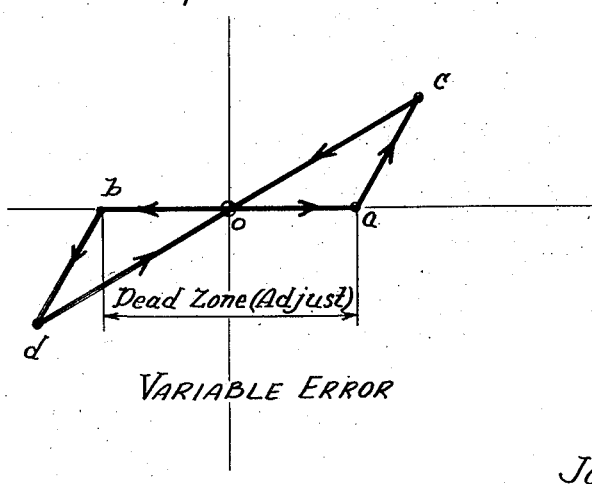
Fig. 5 is a graphic representation of the response characteristic of a relay system including the invention.

Fig. 5 shows in graphical form the general characteristic of the system arranged in accordance with the invention, magnitude of corrective action applied to, or speed of the controlled member, as electrode 11 of Fig. 1, being plotted as abscissae and the magnitude of error as ordinates. As the magnitude of error signal increases in either sense from the zero-representing value, represented at the origin O, as represented by curve legs Oa, Ob, and in the range preselected for dead zone or non-response of the system, the controlled member is maintained stationary. Upon arrival of the error signal magnitude at a selected dead zone limit value, the system operates, first as represented by curve leg ac or bd to move the controlled member at a speed corresponding to the error signal magnitude, the degree of its variance from zero-representing value, and then as represented by leg co or do to maintain the output member continuously in motion at a speed corresponding to the signal magnitude. In each of the specific system arrangements shown, a translator that is convertible between a lost motion and a positive drive condition and that is interposed between preceding and succeeding members of an actuating train is combined with, first, restraining means that resiliently resists movement of the succeeding member from its neutral position in response to movement of the preceding member, second, a selector device that is responsive to signal magnitude, specifically as translated by movement of a preceding actuating train member to store or accumulate an auxiliary condition such as displacement of piston 42 in Figs. 1 and 2, movement of rod 113 in Fig. 3, or movement of both jet pipe 126 and needle 152 in Fig. 4, and in response to the preselected dead zone limit signal magnitude value, first, to overcome the restraining means, second, to move the succeeding train member to a position corresponding to the error signal magnitude, and third, to convert the translator to and maintain it in its positive drive condition. Finally the selector device acts in response to disappearance of the error signal and return of the train members between which is interposed the convertible translator device, to convert the translator to its lost motion condition and reestablish effectiveness of the restraining means, thereby restoring the dead zone system condition.

As indicated above, the set point of the system of Fig. 1 may be established by adjustment of spring 34, and similar setting springs may be employed in the system of Figs. 3 and 4. In a system provided with a proportioning, control member-restoring train, such as 43, 44, 46, 45 of Figs. 1 and 2 or the similar system 110, 109, 111, 112 of Fig. 3, dead zone limits can be established by adjustment along the lever, 43 or 109, of the fulcrum point, as by a fulcrum block 161 mounted for positional adjustment along a support rod 162. In an electrical selector system, as in Fig. 4, dead zone limits can be adjusted by changing positions of switches 148, 149 so that they are closed by deflections of needle 147 from its zero position of magnitudes corresponding to selected degrees of variance of control signal magnitude from its zero-representing value.

From the foregoing the novel concepts of the invention, and arrangements designed to employ and obtain the benefits thereof will be apparent, and consequently it will be perceived that many changes and modifications of the purely exemplary disclosures herein made may be resorted to within the bounds of the invention which are defined solely by the appended claims.

I claim:

1. A regulator system including a controlled member that is movable, from a neutral position wherein it is effective to prevent delivery of energy for utilization by a power unit, to effect delivery of such energy; a train of successive, movable members each succeeding one of which is movable in response to movement of a preceding one; an amplifier having a movable output member that constitutes one of said train members and that is movable from a neutral position corresponding to said controlled member neutral position; and a control element constituting another one of said train members and that is movable from a neutral position corresponding to the other said neutral positions, wherein it is effective to maintain said amplifier output member stationary, in response to variance of a control signal from a selected zero-representing value and to operate said amplifier to move the output member thereof toward a position corresponding to degree of control signal magnitude variance from said value; lost motion means between a pair of successive ones of said members; means effective while the succeeding one of said pair of members is in a neutral position corresponding to the other neutral positions to restrain that succeeding member against movement in response to said preceding member; means responsive to increase of signal magnitude from its zero-representing value to a preselected value of signal magnitude to overcome said restraining means and to move said succeeding member to a position corresponding to the signal magnitude and to establish a positive drive between said pair of members; and means responsive to return of said succeeding member to its neutral position to interrupt the positive drive established by said condition magnitude responsive means.

2. A regulator system including a controlled member that is movable, from a neutral position wherein it is effective to prevent delivery of energy for utilization by a power unit, to effect delivery of such energy; a train of successive, movable members each succeeding one of which is movable in response to movement of a preceding one; an amplifier having a movable output member that constitutes one of said train members and that is movable from a neutral position corresponding to said controlled member neutral position; and a control element constituting another one of said train members and that is movable from a neutral position corresponding to the other said neutral positions, wherein it is effective to maintain said amplifier output member stationary, in response to variance of a control signal from a selected zero-representing value and to operate said amplifier to move the output member thereof toward a position corresponding to degree of control signal magnitude variance from said value; lost motion means between a pair of successive ones of said members; means effective while the succeeding one of said pair of members is in a neutral position corresponding to the other neutral positions to resiliently restrain that succeeding member against movement in response to movement of said preceding member; means responsive to increase of signal magnitude from its zero-representing value and while said succeeding member is restrained in its said position to develop an auxiliary condition the magnitude of which increases as a function of the increasing signal magnitude; means acting in response to increase of magnitude of said auxiliary condition to a value corresponding to a preselected value of signal magnitude to exert on said succeeding member a force sufficient to overcome said restraining means and to move said succeeding member to a position corresponding to the signal magnitude and to establish a positive drive between said pair of members; and means responsive to reduction of the magnitude of said control signal substantially to its zero-representing value to interrupt the positive drive established by said condition magnitude responsive means.

3. A hydraulic regulator system including a controlled member that is movable, from a neutral position wherein it is effective to prevent delivery of energy for utilization by a power unit, to effect delivery of such energy; a mechanism train of successive, movable members each succeeding one of which is movable in response to movement of the preceding one, and said train members including a piston movable in a cylinder to supply power for moving said controlled member and a control element that is movable, in response to variance of magnitude of a control signal from a selected zero-representing value, from a neutral position corresponding to said signal value and to said controlled member neutral position and wherein it is effective to maintain equal pressures in the different ends of said cylinder, and movement of said element from said neutral position effecting delivery of fluid to one of said cylinder ends at a greater volume rate than to the other of said cylinder ends; translator means interposed between a pair of successive ones of said members and convertible between first and second conditions respectively permitting and preventing relative movement between said pair of successive members, said translator means including a restraining device effective while the succeeding one of said pair of members is in a neutral position corresponding to the other said neutral positions to resist movement of that succeeding member from its neutral position in response to movement of the control element from its neutral position; means responsive to a preselected degree of increase of signal magnitude from its zero-representing value to overcome said restraining device, move said succeeding member to a position corresponding to the signal magnitude, and convert said translator means to said second condition, and means responsive to decrease of signal magnitude to its zero-representing value to convert said translator means to said first condition.

4. A hydraulic regulator system including a controlled member that is movable, from a neutral position wherein it is effective to prevent delivery of energy for utilization by a power unit, to effect delivery of such energy; a train of successive, movable members each succeeding one of which is movable in response to movement of the preceding one, and said train including as members of said train a piston movable in a cylinder to supply power for moving said controlled member, and a control element for regulating delivery of fluid to said cylinder and that is movable, in response to variance of magnitude of a control signal from a selected zero-representing value, from a neutral position corresponding to said signal value and to said controlled member neutral position and wherein it is effective to maintain equal pressures in the different ends of said cylinder, and from which neutral position said control element is movable to unbalance those pressures by effecting delivery of fluid to one and exhaust of fluid from the other of said cylinder ends; lost motion means interposed between a pair of successive ones of said members; means effective while the succeeding one of said pair of members is in a neutral position corresponding to the other said neutral positions to resiliently restrain that succeeding member from movement in response to movement of the control element from its neutral position; means responsive to increase of signal magnitude from its zero-representing value and while said succeeding member is restrained in its said position to develop an auxiliary condition the magnitude of which increases as a function of the increasing signal magnitude; means acting in response to increase of magnitude of said condition to a value corresponding to a preselected value of signal magnitude to exert on said succeeding member a force sufficient to overcome said restraining means and also acting to move said succeeding member to a position corresponding to the signal magnitude, and to disable said lost motion means and to establish a positive drive between said pair of translating members, and means responsive to return of said succeeding member to its neutral position to reestablish said lost motion connection.

5. A relay regulator system for positioning a controlled member that is movable from and to a neutral position; said system comprising a train of members successively movable to position said controlled member, each succeeding one of all of said members being arranged for movement by force exerted upon it as a consequence of movement of a preceding one of them and each of said members having a neutral position corresponding to said controlled member neutral position; a hydraulic amplifier including a cylinder, a piston movable in said cylinder and constituting one of said train members, and a control element that constitutes another one of said train members, that acts while in its neutral position and while displaced therefrom respectively to maintain balance of pressures in opposite ends of said cylinder and to effect delivery and exhaust of operating fluid to and from the different cylinder ends, and that is movable from said position in response to variance from a zero-representing value of the magnitude of a control signal imposed thereon; resilient means effective while a succeeding one of said members is in its neutral position to resist movement of that said member, the latter said means including resilient biasing means capable of resisting a preselected magnitude of force, lost motion means interposed between said succeeding member and a preceding one of said train members and means for limiting to less than said preselected magnitude the magnitude of force exerted on said succeeding member as a consequence of movement of said preceding member; means acting in response to a preselected magnitude of variance of the control signal from said zero-representing value to disable said force-limiting and lost motion means thereby to establish a positive drive coupling between said succeeding and preceding members; and means acting in response to return of said succeeding member to its neutral position to disable said positive drive coupling, and to restore said lost motion resilient biasing and force limiting means to operation.

6. Relay regulator means according to claim 5, wherein said piston and control element respectively constitute said succeeding and preceding members, said resilient means comprise a spring system biasing said piston to its neutral position, said lost motion and force limiting means comprise a pair of bleeder lines communicating respectively with the different said cylinder ends, and said signal responsive means comprise cutoff valve means actuable to permit or prevent bleeder flow through said lines and actuating means responsive to increase to said preselected degree of signal magnitude variance from, and return of signal magnitude to said zero-representing value, respectively to open and close said cutoff valve means.

7. Relay regulator means according to claim 6, wherein said bleeder lines are interconnected to provide a bypass between said cylinder ends.

8. A signal controlled regulator system for positioning control of a member that is movable, from and to a zero position, said system comprising a mechanism train for moving said member and including plural movable members each of which has a neutral position corresponding to said zero position, a signal responsive control member constituting one of said train members and that is movable from a neutral position corresponding to said neutral and zero positions in response to variance from a zero-representing value of the magnitude of a control signal imposed thereon, and system condition-selective means including a selector member having a neutral position corresponding to the other said neutral and zero positions and movable therefrom in response to variance of said signal from said zero-representing value and to a distance from said position that is a function of degree of that variance, resilient means effective while a certain one of said members is in its neutral position to resist movement of that member by exerting thereon a force of preselected magnitude, and translating means interposed between said certain one member and a preceding member of said train that is movable in response to signal magnitude variations, said translating means having a first condition established by movement of said selector element a preselected distance from its neutral position and in which condition said translating means overcomes said resilient means, drives said certain member to a position corresponding to degree of variance of said signal magnitude from its zero-representing value, and couples said certain member to said preceding train member for moving the former in correspondence to movements of the latter, said translator means having a second condition established by return of said selector element and certain member to their neutral positions and permitting movement of said preceding member relative to said certain member.

9. In a regulator system that includes, as successively actuated members of an operating mechanism train, a control element that is moveable from a neutral position in response to variance of magnitude of a control signal thereon imposed from a preselected zero-representing value, a piston movable in a cylinder in response to delivery of operating fluid to one and exhaust of the other end of the latter, and a transmission element mounted for movement by said piston, said piston and transmisison element having neutral positions corresponding to that of said control element; an arrangement for maintaining said system in non-operating condition during increase to a preselected degree of signal magnitude variance from said zero-representing value, automatically converting said system, upon increase of signal magnitude variance to said preselected degree, to a proportional response operating condition wherein said transmission element is maintained in positional correspondence to control signal magnitude, and automatically restoring said non-operating system condition in response to decrease of signal magnitude from said degree of variance to substantially said zero-representing value; said arrangement comprising means effective while a certain one of said train members is in its neutral position to resiliently restrain that said member from moving, translating means convertible between an active condition wherein it overcomes said restraining means and moves said certain train member to positions spaced from the neurtal position thereof in proportional correspondence to degree of variance of signal magnitude from said zero-representing value and in response to movement of said control member and an inactive condition permitting said certain member to be restrained in its neutral position independently of the position of said control element, and means responsive to signal magnitude variance from said value to said preselected degree and to its decrease from said degree to substantially said zero-representing value, respectively to convert said translating means to said active and inactive conditions.

10. An arrangement according to claim 9, wherein said transmission element constitutes said certain train member and is provided with a pair of surfaces facing respectively in the directions in which that element is movable, said restraining means comprise a pair of latching members resiliently biased respectively into the paths wherein the different said surfaces travel as said transmission element moves in opposite directions from said position and into restraining contact with said surfaces while that element is in said position, each of said latching members being movable out of said path by movement of said transmission member in the corresponding direction from said position, and said translating and converting means comprise fluid delivery means responsive to movements of said control element and piston to position the latter in correspondence to control signal magnitude and a resilient element interposed between said piston and transmission element, that is distortable in the directions of their movement, and that has a characteristic relationship between degree of its distortion and magnitude of force that it exerts, to exert on a said biased latching member a force sufficient to move the latter from the path of the corresponding one of said surfaces upon movement of said piston to a position corresponding to said preselected degree of signal magnitude variance.

11. In a regulator system that includes, as successively actuated members of an operating mechanism train, a control element that is movable from a neutral position in response to variance of magnitude of a control signal thereon imposed from a preselected zero-representing value, a piston movable in a cylinder in response to delivery of operating fluid to one and exhaust of the other end of the latter, and a transmission element connected to said piston for movement with it, said piston and transmission element having neutral positions that correspond to said control element neutral position; an arrangement for maintaining said system in non-operating condition during increase to a preselected degree of signal magnitude variance from said zero-representing value, automatically converting said system, upon increase of signal magnitude variance to said preselected degree, to a proportional response operating condition wherein said transmission element is maintained in positional correspondence to control signal magnitude, and automatically restoring said non-operating system condition in response to decrease of signal magnitude from said degree of variance to substantially said zero-representing value; said arrangement comprising bias means urging said piston to its neutral position, fluid delivery and exhaust means connected to the different ends of said cylinder and responsive to movement of said control element from its neutral position to deliver fluid to one and exhaust the other of said cylinder ends, a bleeder line communicating with the one of said cylinder ends to which operating fluid is delivered, cutoff valve means connected in said bleeder line and actuable between open and closed conditions, and actuating means responsive to increase of control signal magnitude from said zero-representing value to said selected degree of variance therefrom to close said cutoff valve means, and responsive to decrease of control signal magnitude from said preselected degree of variance to substantially said zero-representing value to open said cutoff valve means.

12. An arrangement according to claim 11, wherein said actuating means include an auxiliary control member movable, from a neutral position corresponding to the other said neutral positions, in proportional response to variations in control signal magnitude, and to a second position that corresponds to said pre-selected degree of control signal magnitude variance from said zero-representing value, and valve control means actuated in response to arrival of said auxiliary control member at said second position to close said cutoff valve means, and responsive to return of control signal magnitude from said preselected degree of variance to substantially said zero-representing value to open said cutoff valve means.

13. An arrangement according to claim 12, wherein said auxiliary control member is movable to its neutral position in response to decrease of control signal magnitude to said zero-representing value, and said valve control means are actuated in response to arrival of said auxiliary control member at its neutral position to open said cutoff valve means if closed at that time.

14. An arrangement according to claim 11, wherein said actuating means comprise a solenoid actuator having a winding and a moving part connected to said valve means for actuating the latter from one to another of said conditions respectively in response to energization and deenergization of said winding, an energizing circuit connected to said winding and including a switch having make and break conditions, a second solenoid that is energizable and deenergizable to convert said switch from one to another of said conditions, an energization circuit for the winding of said second solenoid and including an energizing switch for closing said circuit and a holding switch that is opened and closed respectively in response to energization and deenergization of said second solenoid, and that is connected parallel to said first switch between first terminals of said second solenoid and a supply terminal, and a deenergization switch series connected with the two first said switches and said second solenoid, and an auxiliary control member movable in response to control signal magnitude variations and having a neutral position corresponding to the other said neutral positions and wherein it is maintained while control signal magnitude is of said zero-representing value, and a second position to which it is moved in response to increase of signal magnitude to said preselected degree of variance from that said value, said energizing and deenergizing switches having actuators positioned for contact and switch operation by said auxiliary control member, one in arrival of the latter at said second and the other in its arrival at said first position, and in senses to open and close the first said solenoid energization circuit switch in senses to open and close said cutoff valve means in response to arrival of said auxiliary control member respectively at said first and second positions.

15. An arrangement according to claim 11, wherein said fluid delivery and exhaust means are arranged to deliver fluid to and exhaust the said cylinder ends in reversed senses respectively in response to movement of said control element in different directions from its neutral position, and including a second bleeder line, each of said bleeder lines communicating with a different said cylinder end, and wherein said cutoff valve means are connected in both of said bleeder lines.

16. An arrangement according to claim 11, wherein said fluid delivery and exhaust means are arranged to deliver fluid to and exhaust the said cylinder ends in reversed senses respectively in response to movement of said control element in opposite directions from its neutral position, and said bleeder line is connected between said cylinder ends to afford a bypass between them while said cutoff valve means are open.

17. An arrangement according to claim 11, including a second cylinder having one of its ends connected with said bleeder line, a second piston movable in said second cylinder and constituting said auxiliary control member, spring means biasing said second piston to its neutral position, and a valve connected with the latter said cylinder end and openable and closable respectively to block and open a bleeder path therefor, and wherein said cutoff valve means is opened in response to arrival of said second piston at its said preselected position and closed in response to arrival of the first said piston at its neutral position while said second piston is in its neutral position.

18. In a relay system for positioning a controlled element relative to a neutral position thereof and in response to degree of variance of magnitude of a control signal from a preselected zero-representing value, and which system includes a hydraulic amplifier comprising a cylinder, a piston movable therein and connected to said controlled member, and a control element that is movable, in response to variance in magnitude of a control signal from said value and in a direction corresponding to sense of variance, from a neutral position and wherein it is effective to maintain balance between pressures in the different ends of said cylinder, to effect delivery of operating fluid to one and exhaust the other of said cylinder ends in a sense corresponding to direction of its movement from said position; system response condition-selective means, comprising a pair of bleeder lines respectively communicating with the different said cylinder ends, a second cylinder the different ends of which respectively are connected with the different said bleeder lines, a second piston movable in said second cylinder, spring means biasing said second piston to an intermediate position, a bypass system interconnecting said second cylinder ends and including a pair of parallel branch lines, a first pair of selector valves the different ones of which are connected respectively in the different said bleeder lines, a second pair of selector valves the different ones of which respectively are connected in the different said parallel bypass branch lines whereby an open condition of either establishes a bypass path between said second cylinder ends, a pair of selector valve actuator assemblies each comprising an actuator piston, means connecting the different ones of the latter pistons with a different two of said selector valves each of which comprises a different valve of each said pair and said connecting means acting to open and close the valves connected to a said actuator piston in reversed senses and in respective response to movement of the connected piston to different limit positions, a spring biasing each said actuator piston to a neutral one of said limit positions wherein the selector valves connected with it and respectively belonging to said first and second valve pairs are open and closed respectively, a pair of actuator cylinders wherein respectively the different said actuator pistons are movable, each of said actuator cylinders having a port communicating with the end of that cylinder wherein pressure is effective to urge the piston in that cylinder in the direction to close and open the connected valves that respectively belong to said first and second valve pairs, each of said actuator cylinders having a structure positioned for contact by the piston in that cylinder while in said neutral limit position and that is effective only while so contacted to limit the piston area upon which is effective the pressure within that said cylinder end and admitted through said port, each of said actuator cylinder ends being connected with a different one of said bleeder lines, and the second end of each said actuator cylinder being connected with the bleeder line to which is connected the first end of the other actuator cylinder.

19. System response condition-selective means according to claim 18, wherein each of the assemblies comprising an actuator piston and cylinder is provided with bleeder means disposed to conduct leakage from the area facing the piston surface outside said restricted area past that piston while it is in contact with said structure.

20. System response condition-selective means according to claim 18, wherein said biasing springs exert greater resistance to movement of the actuator pistons from their neutral positions than said biasing means exert to movement of said second piston from its neutral position.

21. System response condition-selective means according to claim 18, including a proportional operation repositioning transmission connected to said second piston and the said control element, for restoring the latter to its neutral position upon completion by said second piston of movement through a distance having a preselected proportional relation to distance of movement of said element from its neutral position.

22. A selector assembly including a pair of movable members and arranged to move one and the other thereof from a neutral to an activated position in response to a preselected magnitude of differential between internal pressures of a pair of pressure lines and respectively in response to opposite senses of such unbalance, and to restore either said member from its activated to its neutral position only upon rebalance of said pressures; said assembly comprising structure enclosing a pair of spaced cylinder bores, a piston and control valve body movable in each said bore and respectively constituting the different said members, means biasing each said body toward a first end of the bore wherein it is movable and toward its said neutral position, said structure being provided with a pair of first control ports for connection to a said pair of pressure lines and each opening into the said first end of a different one of said bores, a pair of passages respectively connecting said first end of each bore with the second end of the other bore, and second control ports respectively opening into the second ends of said bores for connection to a said pair of said pressure lines in the opposite sense with relation to the ones thereof to which the first control ports opening into the same bores are connected, and means positioned in each said bore end having a surface that surrounds a limited portion of the area of that bore end and that is in communication with the first control port that opens into that end, said means having a surface facing and in opposition to an end surface of the said body in that bore and disposed for contact with the latter surface while that said member is in its neutral position.

23. A selector assembly provided with first and second input ports, including a pair of movable members and arranged to move one or the other respectively in response to sense of, and upon increase to a preselected magnitude of differential between pressures respectively effective in said ports, from a normal to an actuated position and to restore a said member from its actuated to its normal position only upon equalization of said port pressures, said assembly comprising structure provided with said ports and enclosing a pair of separate cylinder bores, a pair of piston and valve bodies respectively movable axially in the different said bores, spring means biasing said members toward first ends of the bores wherein respectively they are movable and toward their said normal positions, said structure being provided with passages maintaining said first ends of a first and a second one of said bores respectively in communication with said first and with said second input ports, and the second ends of said first and second zores respectively in comunication with said second and with said first input ports, and structure at the first end of each said bore, defining an open area less than the cross section of that said bore, wherein is effective the pressure of the input port connected with that bore end, and surrounded by a contact surface disposed for seating of an opposed piston surface of the body movable in that bore while in its normal position, said areas and the forces exterted on said bodies by said blasing means being selected, relative to said pre-selected pressure differential magnitude and the piston areas of said bodies exposed to pressures in said second bore ends, to move said bodies from their netural positions only when a said differential equals said magnitude.

24. A control assembly for automatic selection between connection and disconnection of each of first and second service ports respectively to and from the corresponding ones of first and second supply ports, to maintain communication between the two said first ports and between the two said second ports while differential between two input pressures respectively effective in the different said supply ports is of less than a preselected magnitude, to block communication between said service and input ports upon increase of said differential to said magnitude, and to reestablish communication between said first ports and between said second ports only upon equalization of said input pressures, said assembly comprising structure provided with said ports and enclosing a first and second cylinder bore, first and second piston and valve bodies respectively movable axially in said first and second bores and each comprising a pair of axially spaced, connected lands, spring means biasing said members towards first ends of the bores wherein they are movable and toward normal limit positions said structure being provided with control passages for conducting the pressure of said first supply port to said first end of the first bore and the second end of said second bore, and the pressure of said second supply port to said first end of said second bore and the second end of said second bore, two pairs of flow control ports respectively opening into the different said bores, the ports of each said pair being spaced axially of the bore into which they open in a location to be placed in communication through the space between the lands of the said body in that bore while in its actuated position and to be blocked from communication by a said land while that member is in its normal position, and passages connecting the different ones of the pairs of cylinder ports that open respectively into the first and second bores, respectively with said first service and supply ports and with said second service and supply ports, and means at the first end of each said bore defining an area that is smaller than the cross section of that bore and that is maintained in communication with the supply port connected with the first end of that bore, and said means having a surface surrounding said area and disposed for seating contact by an opposed piston surface of the body member movable in that bore while in its normal position.

25. An assembly according to claim 24, wherein said structure is provided with a pair of auxiliary flow passages each terminating in two cylinder ports that respectively open into a different one of said bores, the latter said cylinder ports that open into each said bore being axially spaced, at least one of them being located to be blocked by a said land while the body in that bore is in its normal position, and both of them being located to register with the space between the lands of that body while in its actuated position, whereby said service ports are placed in inter-communication by movement of either said body to its actuated position.

References Cited in the file of this patent

UNITED STATES PATENTS

| | | |
|---|---|---|
| 2,169,982 | Manteuffel | Aug. 15, 1939 |
| 2,541,805 | Berkey | Feb. 13, 1951 |
| 2,790,090 | Hinde | Apr. 23, 1957 |
| 2,797,666 | Chubbuck | July 2, 1957 |